May 5, 1925.  
E. E. ASHLEY, JR  
1,536,748  
ELECTRICAL WIRING SYSTEM  
Filed Jan. 14, 1924  
3 Sheets—Sheet 1
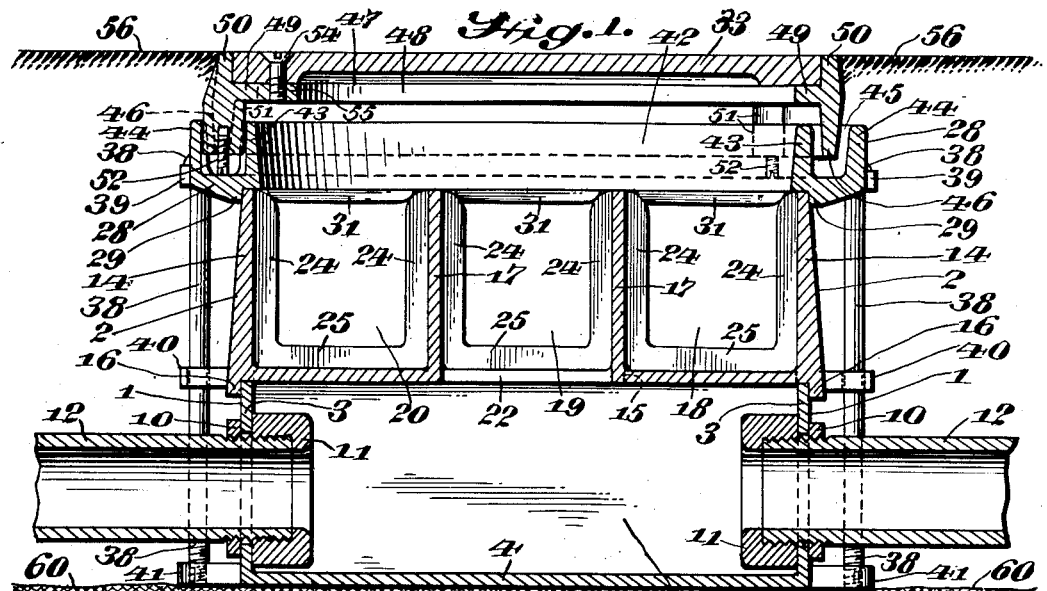
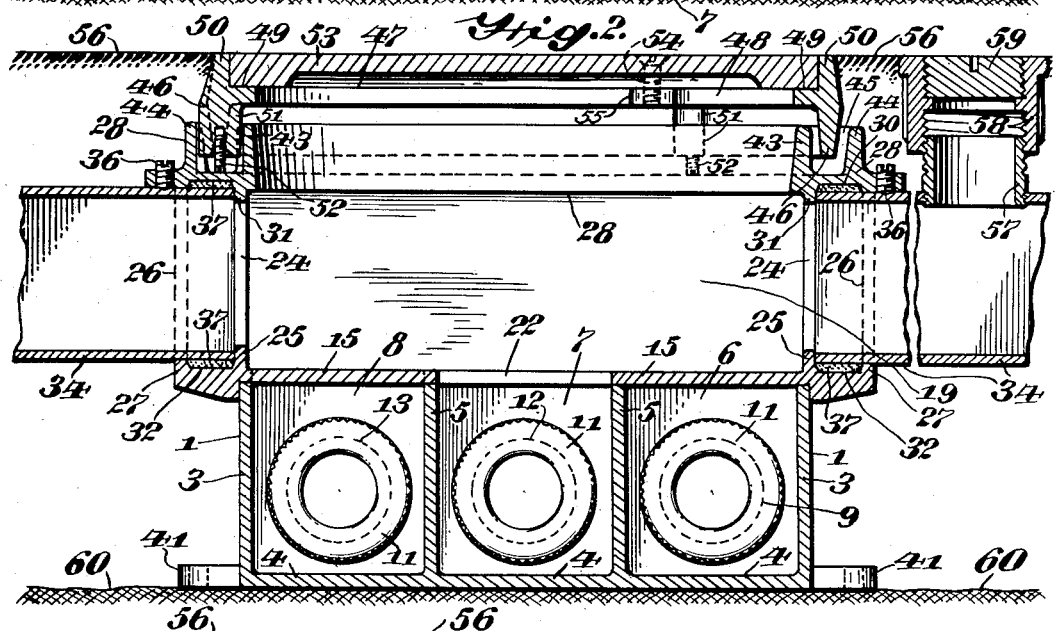
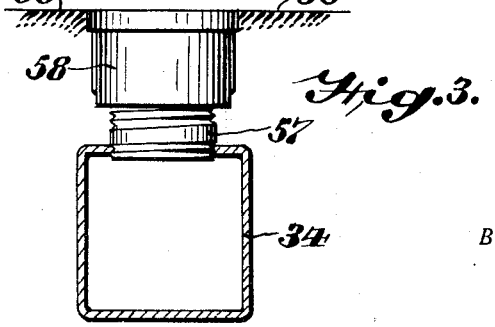
INVENTOR.  
Edward E. Ashley Jr.  
BY Cornelius L. Ehret  
his ATTORNEY.

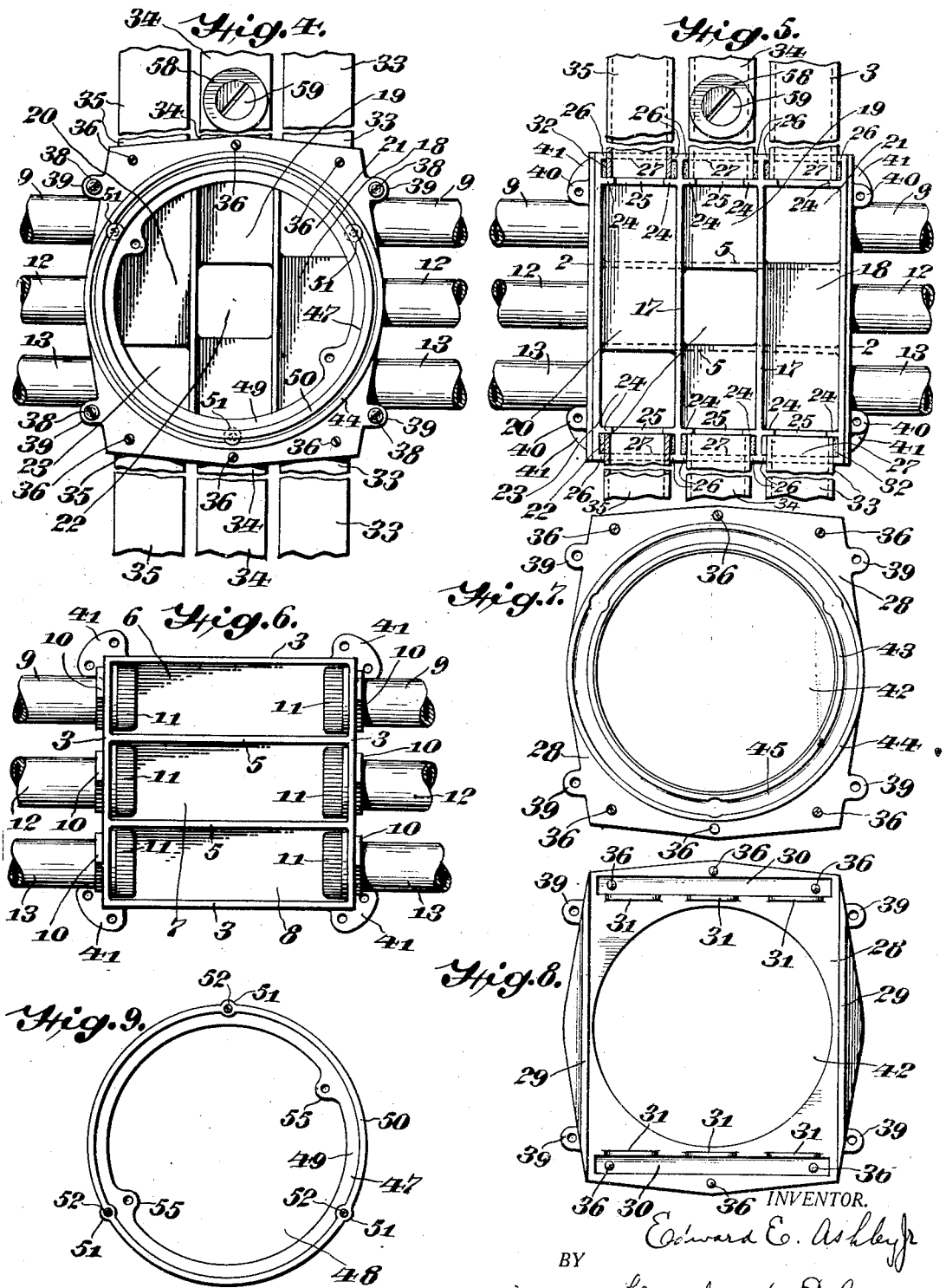

May 5, 1925.  1,536,748
E. E. ASHLEY, JR
ELECTRICAL WIRING SYSTEM
Filed Jan. 14, 1924   3 Sheets-Sheet 3

INVENTOR.
Edward E. Ashley Jr
BY
Cornelius D. Ehret
his ATTORNEY.

Patented May 5, 1925.

1,536,748

UNITED STATES PATENT OFFICE.

EDWARD E. ASHLEY, JR., OF NOROTON, CONNECTICUT, ASSIGNOR TO WALKER BROTHERS, OF PHILADELPHIA, PENNSYLVANIA, A CORPORATION OF PENNSYLVANIA.

ELECTRICAL WIRING SYSTEM.

Application filed January 14, 1924. Serial No. 686,141.

REISSUED

*To all whom it may concern:*

Be it known that I, EDWARD E. ASHLEY, Jr., a citizen of the United States, residing in Noroton, county of Fairfield, State of Connecticut, have invented certain new and useful Improvements in Electrical Wiring Systems, of which the following is a specification.

My invention relates to a system of electrical wiring for office or other buildings, hotels, factories, apartment houses, residences, etc., and relates more particularly to a system of concealed wiring disposed in conduits located in the walls or partitions of the buildings, and more particularly in the floors.

In accordance with my invention, the main or supply circuit conductors of lighting, power, telephone, signaling or other circuits are disposed in one or more conduits, while the branch or consumption circuit conductors, extending to the points of connection of the electric lights, power devices, telephone instruments, signals, etc., are disposed in a conduit or conduits, the main or supply and branch or consumption circuit conduits being disposed either in the same plane in a wall or floor, or preferably in different planes, and preferably extend transversely to each other at right angles or any other convenient or suitable angle, the conduit or conduits of the main or supply and consumption or branch circuits meeting in a wall or floor box structure in different planes or at different levels, where connections are effected between the main or supply circuit conductors and the branch or consumption circuit conductors.

Further in accordance with my invention, I provide wall or floor box structure, preferably in sections, providing in different planes or at different levels passages or channels extending transversely to each other with suitable opening or openings between the different sections or levels to permit connection of main and branch circuit conductors to each other within the box structure, the conduits of the main and branch circuits communicating with the aforesaid passages or channels.

My invention resides in the system and apparatus of the character hereinafter described and claimed.

For an illustration of one of various forms my invention may take, reference is to be had to the accompanying drawings, in which:

Fig. 1 is a vertical sectional view, partly in elevation, of a box structure and associated conduits embodying my invention.

Fig. 2 is a vertical sectional view, partly in elevation, taken at right angles to Fig. 1.

Fig. 3 is a vertical sectional view, partly in elevation, of a conduit with applied outlet structure.

Fig. 4 is a top plan view, on smaller scale, of the structure shown in Figs. 1 and 2, with the cover removed.

Fig. 5 is a top plan view of the structure shown in Fig. 4 with the parts surmounting the upper box section removed.

Fig. 6 is a top plan view of the lower box section.

Fig. 7 is a top plan view of the member surmounting the upper box section.

Fig. 8 is a bottom plan view of the member shown in Fig. 7.

Fig. 9 is a bottom plan view of the cover-holding ring which surmounts the member shown in Fig. 7.

Figure 11:
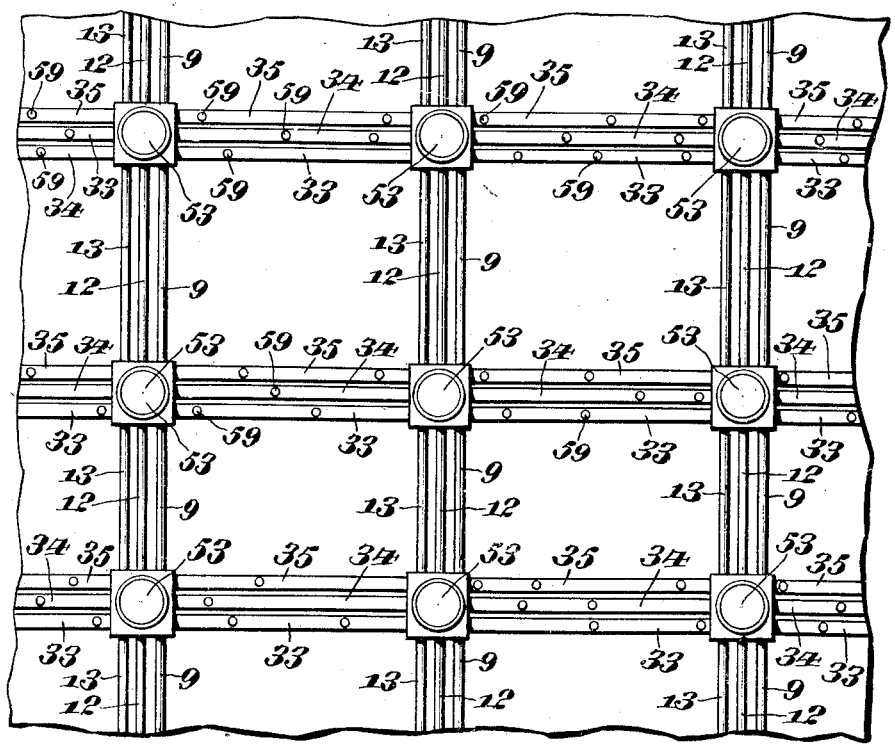
Fig. 11 is a fragmentary plan view of a system embodying my invention.

Referring to the drawings, the floor box comprises the lower metallic section 1, preferably rectangular, surmounted by the upper or second metallic section 2, preferably rectangular. The section 1, shown in plan in Fig. 6, is open at its top and comprises the side walls 3, bottom 4, and the parallel transversely extending partition walls 5 forming within the lower section or box 1 the parallel transversely extending passages or channels 6, 7 and 8.

In the example illustrated, there are provided three passages or channels 6, though it will be understood that a greater or lesser number may be employed, as occasion may require.

Communicating with the passage 6 is the metal or other conduit or pipe 9, suitably secured to the side walls 3, as by the nut 10 threaded on the conduit 9 on the exterior of the box section 1, and the conduit bushing 11 threaded upon the conduit on the inside of the box section 1. Similarly, the conduits 12 and 13 communicate, respectively, with the passages or channels 7 and 8, and are similarly secured to the walls 3 of the box section 1. The upper box or box section 2 has the side walls 14 and bottom 15, the latter resting upon the upper edge of the box section 1, the downwardly depending flange 16 on the section 2 embracing or receiving the upper end of the box section 1. The partition walls 17 extend transversely of the box section 2, dividing it into the three channels or passages 18, 19 and 20, the walls 17 and the passages 18, 19 and 20 extending preferably transversely of the partitions 5 and passages 6, 7 and 8 of the lower box section, 1 though it will be understood that if suitable or desirable, the passages and partitions of the upper box section may extend parallel with those of the lower box section.

In the bottom 15 of the upper box section there is provided the opening 21, in the passage 18, thereby affording communication between the passage 18 of the upper box section and the passage 6 of the lower box section. Similarly, in the bottom 15, in passage 19, is formed the opening 22, affording communication between the passage 19 of the upper box section and the passage 7 of the lower box section. Similarly, in the bottom 15 is provided the aperture 23 in channel 20 to afford communication with the channel 8 of the lower box section.

At opposite ends of each of the passages 18, 19 and 20 of the upper box section 2, which is open at its top, are provided the side inwardly extending ribs or flanges 24 and the upstanding bottom flanges or ribs 25, spaced from which are the similar ribs or flanges 26 and 27.

Surmounting the upper box section 2 is the member 28, having along two of its opposite sides the downwardly depending flanges 29 embracing the upper end of the box 2.

Adjacent its ends the member 28 is provided with elongated recesses or channels 30 adjacent the ribs 31, which are disposed substantially in the plane of the ribs 24 and 25 on the box section 2. The channels 30 are in register with the spaces or chambers 32 in the box member 2, between the ribs 24 and 25 on the one hand, and 26 and 27 on the other hand. The rectangular conduits 33, 34 and 35 extend through the opening formed by the ribs or flanges 26, 27 and the cover member 28 into the chambers 32, and abut against the ribs or flanges 24, 25 and 31. Threaded through the member 28 are the pointed screws 36 engaging the conduits 33, 34 and 35 and grounding the metallic box structure to them. In the chambers 32, around the conduits 33, 34 and 35, may be applied any suitable cement 37 for holding the conduits in place.

Bolts or screws 38 extend through the lugs 39 upon the member 28, through the lugs 40 on the box member 2, and thread into the lugs 41 upon the box section 1, whereby the members 1, 2 and 28 are securely held or clamped to each other.

The member 28 has the circular opening 42, through which access is had to the three passages or channels 18, 19 and 20 of the upper box section 2. Surrounding the opening 42 is the annular flange 43, spaced from which is the annular flange 44, between which is formed the annular channel or trough 45, into which projects the annular flange 46 of the cover-holding member 47 having the circular opening 48 disposed above the opening 42 in the member 28. The member 47 has the annular lug 49 and the upstanding annular flange 50. In the bosses 51 are threaded pins or screws 52, which rest upon the bottom of the trough 45 in the member 28, adjustment of the screws serving to level or adjust the member 47 with respect to the floor surface. The circular cover disk or member 53 fits within the flange 50 of the member 47 and rests upon its annular lug 49, and is secured in position by screws 54 threaded into the lugs 55 on member 47, the upper surface of the cover 53 being preferably flush with the upper surface 56 of the floor.

In the conduits 9, 12 and 13 may be disposed the main or supply circuit conductors, and in the conduits 33, 34 and 35 may be disposed the branch or consumption circuit conductors. Or in some one or more of the conduits 9, 12, 13 may be disposed consumption or branch circuit conductors, and in some one or more of the conduits 33, 34 and 35 may be disposed main or supply circuit conductors.

Generally, however, in the conduits at the higher level, such as conduits 33, 34 and 35, will be disposed the branch or consumption circuit conductors, and outlets therefrom may be effected by any suitable means, as for example, the nipples 57, Figs. 2 and 3, threaded into or otherwise secured to the conduits 33, 34 and 35. Threaded upon the nipple 37 is the bushing 58, which may be adjusted to come flush with the floor surface 56 by rotating bushing 58 upon nipple 57. Threaded into the bushing 58 is the closing member or plug 59, whose upper surface is preferably flush with the floor surface 56.

As indicated in Figs. 1 and 2, the floor box, comprising members 1 and 2, may rest upon an unfinished or more or less rough surface 60 of an unfinished floor. For example, 60 may be the upper surface of a cement, concrete, tile or other floor, or substratum of a floor. The screws 52 or some of them are then adjusted to bring the outer faces of the flange 50 and cover plate 53 to a level position corresponding with the level 56 of the floor when finished. With the floor box so in position, and with the main and branch conduits connected thereto, there may be filled in upon the substratum of the floor concrete, cement or other suitable material which flows around the box structure, the conduits, and members 28 and 47, embedding them and holding them in position.

Figure 10:
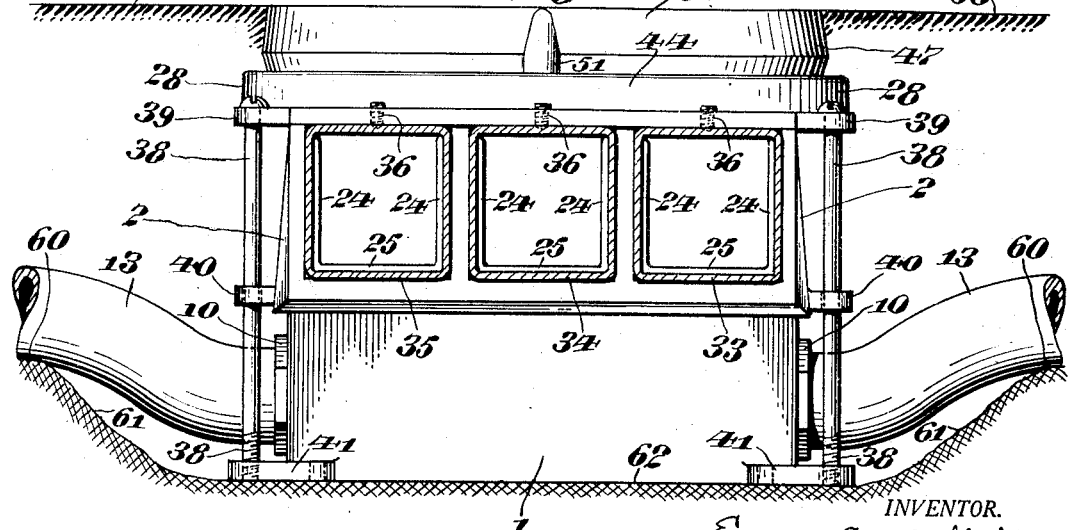
Fig. 10 is a vertical sectional view, partly in elevation, of the floor box in position in a recess in a stratum of the floor.

As indicated in Fig. 10, in some cases the sub-stratum 60 of the floor may be cut away to form a recess 61, upon whose bottom 62 the floor box may rest. In such case it may be necessary or desirable to bend the main conduits, as 9, 12 and 13, upwardly, as indicated in Fig. 10, to clear the normal upper surface 60 of the lower floor stratum.

As indicated in Fig. 11, there may be laid out over a floor or unfinished floor of a building a network of main and branch conduits, with the floor boxes disposed at their intersections, and the outlet devices, such as 58 having the closing plugs 59, are distributed along the conduits 33, 34 and 35 at predetermined intervals, or located in the positions in which it is previously known that outlets must be had. Then the floor may be finished, as above described, by applying concrete, cement or other material embedding the conduits and the floor boxes.

By way of example merely, it may be assumed that through the main conduits 9 extend conductors carrying current for electric lights. The branch lighting circuit conductors will then be disposed in the conduits 33. To carry the electric lighting current to any suitable place, the cover 53 of the appropriate floor box is removed, thereby effecting access through the openings 48 and 52 to the channel 18 of the box section 2. The plug 59 of the appropriate outlet is removed, and the branch circuit conductors inserted through the opening into the conduit 33 and fished therethrough to the channel 18 of the upper box section 2 of the floor box, where they are then connected with the supply circuit conductors in the channel 6 of the bottom box section 1, the opening 21 affording access to the supply circuit conductors for making the connections.

Similarly, through suitable outlet communicating with the conduit 34 telephone conductors may be fished therethrough to the channel 19 of the appropriate floor box and connections then made through the opening 22 with the main telephone conductors in the conduit 12. Similarly, from suitable outlet the conductors of an office signal circuit, as a buzzer circuit, may be passed through the outlet and through the conduit 35 to the channel 20 of the upper box section of the appropriate floor box and connections then extended through the opening 23 into the channel 8 of the lower box section 1, in which are disposed the main circuit conductors extending through the conduit 13.

What I claim is:

1. An electrical wiring system comprising a network of main and branch circuit conduits disposed in a wall, boxes in said wall at which the main and branch circuit conduits meet, each of said boxes having passages disposed in different planes, said main and branch circuit conduits communicating with said passages in different planes, and means for effecting within the box communication between passages in different planes therein.

2. An electrical wiring system comprising a network of main and branch circuit conduits disposed in different planes in a wall, boxes in said wall at which the main and branch circuit conduits meet, each of said boxes having passages disposed in different planes, said main and branch circuit conduits communicating with said passages in different planes, and means for effecting within the box communication between passages in different planes therein.

3. The combination with a box structure having a plurality of channels in each of a plurality of different levels, conduits connected with said box structure and communicating, respectively, with different channels, and means within said box structure effecting communication between the channels in one level and the channels in another level.

4. The combination with a box structure having a plurality of channels in each of a plurality of different levels, the channels in one level extending transversely to the channels in another level, conduits connected with said box structure and communicating, respectively, with the different channels, and means within said box structure effecting communication between the channels in one level and the channels in another level.

5. The combination with a box structure having a plurality of channels in each of a plurality of different levels, the channels in one level extending transversely to the channels in another level, conduits connecting with said box at different levels and communicating with said channels and means within said box structure effecting communication between the channels in one level and the channels in another level.

6. Conduit-connecting box structure comprising superposed box sections each having a channel, the channels in the different sections extending transversely to each other, said channels in the different sections at their intersection communicating with each other.

7. Conduit-connecting box structure comprising superposed box sections each having a plurality of channels disposed side by side, the channels in one of said sections extending transversely to the channels in another of said sections, each channel of one section communicating with a channel of the other section at their intersection.

8. Conduit-connecting box structure comprising superposed box sections each having a channel, the channels in the different sections extending transversely to each other, said channels in the different sections at their intersection communicating with each other, and a pair of conduit sections connecting with opposite ends of each channel and communicating with each other through said channel.

9. Conduit-connecting box structure comprising superposed box sections each having a plurality of channels disposed side by side, the channels in one of said sections extending transversely to the channels in another of said sections, each channel of one section communicating with a channel of the other section at their intersection, and a pair of conduit sections connecting with opposite ends of each channel and communicating with each other through said channel.

10. Conduit-connecting box structure comprising a box section open at its top and having a channel, a second box section having a bottom superposed upon said first section and having a channel extending transversely to the channel in said first section, said bottom of said second section having an aperture effecting communication between said channels in the different sections at their intersection.

11. Conduit-connecting box structure comprising a box section open at its top and having a channel, a second box section having a bottom superposed upon said first section and having a channel extending transversely to the channel in said first section, said bottom of said second section having an aperture effecting communication between said channels in the different sections at their intersection, and a pair of conduit sections connecting with opposite ends of each channel and communicating with each other through said channel.

12. Conduit-connecting box structure comprising a box section open at its top and having a plurality of channels disposed side by side, a second box section having a bottom superposed upon said first section and having a plurality of channels disposed side by side, said bottom of said second section having apertures effecting communication between said channels in the different sections.

13. Conduit-connecting box structure comprising a box section open at its top and having a plurality of channels disposed side by side, a second box section having a bottom superposed upon said first section and having a plurality of channels disposed side by side and extending transversely to the channels in said first section, said bottom of said second section having apertures effecting communication between said channels in the different sections at their intersections.

14. Conduit-connecting box structure comprising a box section open at its top and having a plurality of channels disposed side by side, a second box section having a bottom superposed upon said first section and having a plurality of channels disposed side by side, said bottom of said second section having apertures effecting communication between said channels in the different sections, and a pair of conduit sections connecting with opposite ends of each channel and communicating with each other through said channel.

15. Conduit-connecting box structure comprising a box section open at its top and having a plurality of channels disposed side by side, a second box section having a bottom superposed upon said first section and having a plurality of channels disposed side by side and extending transversely to the channels in said first section, said bottom of said second section having apertures effecting communication between said channels in the different sections at their intersections, and a pair of conduit sections connecting with opposite ends of each channel and communicating with each other through said channel.

16. Conduit-connecting box structure comprising a box section open at its top and having a plurality of channels disposed side by side, a second box section open at its top and having a bottom superposed upon said first section and having a plurality of channels disposed side by side, said bottom of said second section having apertures effecting communication between said channels in the different sections, and cover structure for said second box section having an opening affording access to said channels of said second box section and through said apertures in said bottom to the channels in said first box section.

17. An electrical wiring system comprising main and branch circuit conduits disposed in a wall, a box in said wall at which said main and branch circuit conduits meet, said box having a passage disposed in each of different levels and communicating respectively with said main and branch circuit conduits, and means within said box effecting division between said levels and having an opening for communication between a passage in one level and a passage in another level for effecting within the box connections between the main and branch circuit conductors.

18. An electrical wiring system comprising main and branch circuit conduits disposed in a wall, a box in said wall at which said main and branch circuit conduits meet, said box having a passage disposed in each of different levels and communicating respectively with said main and branch circuit conduits, means within said box effecting division between said levels and having an opening for communication between a passage in one level and a passage in another level for effecting within the box connections between the main and branch circuit conductors, a wall outlet communicating with a branch circuit conduit, and the level of the passage communicating with said branch circuit conduit being disposed adjacent that end of said box nearest the surface of the wall.

19. Wall box structure for a concealed conduit electrical wiring system comprising structure forming a passage in each of different levels, and open at its opposite ends in opposite sides of said box structure, said passages adapted to communicate with conduits at their said opposite ends, and means within said wall box structure effecting communication between a passage in one level and a passage in another level.

20. Wall box structure for a concealed conduit electrical wiring system comprising structure forming a passage in each of different levels, said passages open at their opposite ends in opposite sides of said box structure and extending transversely to each other and adapted to communicate with conduits at their opposite ends, and means within said wall box structure effecting communication between a passage in one level and a passage in another level.

21. An underfloor wiring system for a plurality of electric services of different characters, comprising a plurality of groups of conduits, each group accommodating the conductors of one character of electric service, the conduits of each group extending transversely of each other, and box structure at which the conduits of the several groups meet, said box structure having a plurality of separate passages in each of different levels, the passages in the different levels extending transversely of each other and extending completely through said box, conduits of the different groups connecting, respectively, with the passages in one level, and the remaining conduits of said groups connecting, respectively, with the passages in the other level, and the transversely extending passages for each group of conduits communicating with each other within said box.

22. An underfloor wiring system for a plurality of electric services of different characters, comprising a plurality of substantially parallel conduits for accommodating, respectively, the conductors of the different characters of service, a plurality of boxes spaced from each other longitudinally of said conduits, means forming a plurality of separate passages in each box extending completely therethrough and connecting with said conduits on opposite sides of said box, and at each of said boxes a plurality of transversely extending conduits for accommodating, respectively, conductors of said different characters of service, means in each of said boxes forming independent transverse passages extending completely through said box and disposed in a level different from said first named passages and connecting, respectively, with said transversely extending conduits, and means in each of said boxes forming communication between those passages in different levels which are associated with the conduits for one of said characters of service.

23. In an underfloor wiring system, box structure having a plurality of channels in each of a plurality of different levels, said channels in the different levels extending transversely to each other and completely through said box, conduits connected with said box structure and communicating, respectively, with the different channels in the different levels, a channel in one level communicating with a channel in the other level, and a single opening in said box structure through which is afforded access to all the channels in the different levels.

EDWARD E. ASHLEY, Jr.